(12) United States Patent
Henderson (10) Patent No.: US 9,481,973 B2
(45) Date of Patent: Nov. 1, 2016

(54) CONTINUOUS STRAND HOOP REINFORCEMENT FOR CONCRETE FOUNDATIONS

(71) Applicant: Allan P. Henderson, Bakersfield, CA (US)

(72) Inventor: Allan P. Henderson, Bakersfield, CA (US)

( * ) Notice: Subject to any disclaimer, the term of this patent is extended or adjusted under 35 U.S.C. 154(b) by 0 days.

(21) Appl. No.: 14/692,389

(22) Filed: Apr. 21, 2015

(65) Prior Publication Data

US 2016/0047106 A1 Feb. 18, 2016

Related U.S. Application Data (63) Continuation of application No. 14/187,501, filed on Feb. 24, 2014, now abandoned.

(60) Provisional application No. 61/793,187, filed on Mar. 15, 2013.

(51) Int. Cl.

| E02D 27/32 | (2006.01) |
|---|---|
| E02D 27/42 | (2006.01) |
| E02D 27/50 | (2006.01) |
| E02D 27/02 | (2006.01) |
| E04C 5/08 | (2006.01) |

(52) U.S. Cl.
CPC ............... *E02D 27/42* (2013.01); *E02D 27/02* (2013.01); *E02D 27/50* (2013.01); *E04C 5/08* (2013.01)

(58) Field of Classification Search
CPC ....... E02D 27/02; E02D 27/42; E02D 27/50; E04C 5/08
USPC ............................................ 52/292, 294–297
See application file for complete search history.

(56) References Cited

U.S. PATENT DOCUMENTS

| 1,189,459 A | 7/1916 | Lundin |
|---|---|---|
| 1,463,715 A | 7/1923 | Muhlow |
| 5,050,356 A | 9/1991 | Johnson et al. |
| 5,586,417 A | 12/1996 | Henderson et al. |
| 5,826,387 A | 10/1998 | Henderson et al. |
| 6,672,823 B2 | 1/2004 | Henning |
| 6,705,058 B1 | 3/2004 | Foust et al. |
| 7,533,505 B2 | 5/2009 | Henderson et al. |
| 7,618,217 B2 | 11/2009 | Henderson et al. |
| 7,707,797 B2 | 5/2010 | Henderson et al. |
| 8,056,299 B2 | 11/2011 | Liskey |
| 8,637,767 B2 | 1/2014 | Diaz-Vallellanes |
| 2012/0266447 A1 | 10/2012 | Diaz-Vallellanes |
| 2013/0129474 A1 | 5/2013 | Schacknies et al. |
| 2015/0376859 A1* | 12/2015 | Phuly ..................... E02D 27/42 52/223.1 |

* cited by examiner

*Primary Examiner* — Mark Wendell
(74) *Attorney, Agent, or Firm* — Jacobson Holman, PLLC.

(57) ABSTRACT

A post-tensioned continuous strand hoop reinforcement for concrete foundations is provided. The post-tensioned continuous strand hoop reinforcement compresses the concrete to prevent cracking and significantly reduces foundation deflection and distortion which increases rotational stiffness in anchor caps, spread foundations, and like foundation configurations.

26 Claims, 6 Drawing Sheets

CONTINUOUS STRAND HOOP REINFORCEMENT FOR CONCRETE FOUNDATIONS

This application is a continuation application of co-pending U.S. Ser. No. 14/187,501 filed Feb. 24, 2014, which claimed priority from U.S. provisional application, Ser. No. 61/793,187 filed Mar. 15, 2013, the priority of which is hereby claimed.

BACKGROUND OF THE INVENTION

1. Field of Invention

This invention relates in general to improvements and replacements of steel reinforcing in large concrete support foundations, precast or constructed in-situ, particularly useful for supporting tall, heavy structures including towers which may be used to support wind turbines, power transmission lines, street lighting and signals, bridge supports, commercial signs, freeway signs, ski lifts, and the like.

More specifically, the continuous strand hoop reinforcement of the present invention may be high strength steel strand or cable sleeved to allow post tension useful in compressing the concrete to exceed loads and splitting stresses in the concrete between other reinforcements with minimal deflection and distortion while reducing the steel weight, volume and length currently required of conventional rebar hoops by as much as one-half.

2. Description of Related Art

My earlier U.S. Pat. No. 5,586,417 (my '417 patent) for tensionless pier foundation, U.S. Pat. No. 5,826,387 for pier foundation under high unit compression, U.S. Pat. No. 6,672,823 for perimeter weighted foundation, U.S. Pat. No. 7,533,505 for pile anchor foundation, U.S. Pat. No. 7,618,217 for post tension pile foundation, and U.S. Pat. No. 7,707,797 (my '797 patent) for pile anchor foundation disclose post-tensioned concrete foundations for large supporting structures for which the present invention is applicable. Accordingly, the disclosures of my six aforesaid U.S. patents are expressly incorporated herein by reference as if fully set forth in their entirety.

Conventionally, rebar hoops are circular (lateral) and positioned around and in contact with the vertical or horizontal reinforcing rebars or bolts of the concrete foundation. The rebar hoops are either circular or otherwise configured lengths of rebar lapped at ends sufficiently to provide bonding to the concrete and reinforcement equal to the strength of the steel rebar. The laps considerably increase the quantity of steel where larger diameter hoops are utilized, since additional rebar is required as the rebar steel strength is typically one-third the steel strength of the strand material.

Further, conventional hoops are utilized to prevent the separation of the foundation from occurring between the vertical or horizontal (lateral) steel reinforcing rebar or bolts. However, there is a need to provide hoop strands which can be post-tensioned in order to compress the concrete between the vertical or horizontal (lateral) steel reinforcing rebar or bolts and prevent cracking as well as reducing deflection, distortion, cycling, fatigue and increasing structure life.

SUMMARY OF THE INVENTION

The continuous strand hoop reinforcement or continuous strand reinforcing hoops (used synonymously) according to the present invention resists foundation separation between vertical or horizontal (lateral) rebar or bolt steel reinforcing of the concrete support foundation or similar support foundations constructed of other cementious-type materials (herein collectively broadly referred to as "concrete support foundations" or more simply "concrete foundation" or "concrete foundations").

The continuous strand hoop reinforcement of the present invention preferably comprises strands made from high strength wires, on the order of 250 ksi, twisted into a flexible cable or the like, having a diameter in cross-section of more or less one-half inch. The strands are greased and rubber-sleeved so as to prevent the high strength strands from adhering or bonding to the concrete foundation upon curing and allow the strands to be post-tensioned, as described hereinafter. Other mechanisms may be used to prevent the flexible high strength strands or cables from engaging with the concrete, such as flexible plastic tubing, to shield the cable from the concrete. Other mechanisms will also be understood by those skilled in the art to permit post-tensioning of the strands or cables within the concrete foundation.

The covered or coated strands or cables can be placed on large rolls or hooped for simple delivery to project sites. These coated strands or cables may be in lengths of 1000 feet, more or less, allowing a continuous length of steel strand which may be configured and placed in the concrete foundation in a generally circular or spiral configuration in which each expanding hoop is separated by six inches, more or less. The continuous strand hoop reinforcement is thus mostly circumferentially spaced around and in contact with the vertical or horizontal (lateral) rebar and is preferably positioned by guides and wire tied to the other concrete foundation steel reinforcement.

One end of the continuous coated strands or cables is embedded in the concrete foundation (the "embedded end") with the strands circumferentially wound around and in contact with the other steel reinforcement of the concrete foundation. The other end of the coated strands or cables exits through or adjacent the top of the concrete foundation at a location to readily permit post-tensioning of the coated strands or cables (the "exposed end"). The embedded end of the coated strands or cables is terminated with an end nut or similar apparatus which secures the embedded end in the concrete foundation and prevents its movement when the coated strand or cable is post-tensioned. The exposed end can also be fitted with an end nut-like apparatus with internal wedges which compress into the metal strand or cable to secure the steel from sliding in the wedge. The steel strand or cable can then be post-tensioned by elongating the strands through the wedges by pulling/jacking or the like against a plate set on or in the concrete to create the post-tensioned strand hoop.

As previously described, once the foundation concrete obtains sufficient strength to compress the concrete against and between the vertical or horizontal (lateral) rebar or bolt steel, the continuous strand hoop reinforcement can be post-tensioned to prevent or reduce cracking of the concrete by splitting loads. The space between the circumferential continuous strand hoops is determined by the compressive strength required to prevent cracking of the concrete.

The continuous strand hoop reinforcement contacts and/or ties to all the normal vertical and horizontal (lateral) steel reinforcing when the foundations are flat caps or spreading discs configuration or like. These reinforcing steels are placed near the top and near the bottom.

In accordance with the foregoing, it is an object of the present invention to replace conventional rebar foundation hoops with a continuous strand hoop reinforcement or continuous strand reinforcing hoops, preferably post-tensioned, for concrete foundation piers, caps, spreading discs and the like which can be pre-cast or constructed in-situ for supporting dynamic tall, heavy, and/or large structures including towers and/or poles.

A further object of the present invention is to replace conventional rebar hoops for preventing foundation splitting between standard vertical and horizontal (lateral) reinforcing with continuous strand reinforcing hoops, preferably post tensioned, as described herein.

Another object of the present invention is to provide cost advantage to providing splitting resistance between the vertical and horizontal (lateral) reinforcing steel (rebar and/or bolts) by requiring as much as one-half less of the hoop steel by reinforcing the rebar hoops with continuous strand hoops, preferably post-tensioned.

Yet a further objective of the present invention is reduce the hoop placement time and effort required by reducing the number of wire tie, steel handling, and manpower required for conventional rebar hoops.

Still another objective of the present invention is to post-tension the continuous strand hoops in order to compress the concrete significantly reducing foundation deflecting and distortion while increasing rotational stiffness in flat caps, spreading discs or like foundation configurations.

Further objectives of the present invention are to reduce cycling, fatigue, and greatly increase the foundation life up to as much as four times.

BRIEF DESCRIPTION OF THE DRAWINGS

Other objectives, features, and advantages of the present invention will be apparent to those skilled in the art upon a reading of this specification including the accompanying drawings while intending to illustrate the invention, the drawings are not necessarily to scale.

DESCRIPTION OF THE PREFERRED EMBODIMENTS

Although preferred embodiments of the invention are explained in detail, it is to be understood that the invention is not limited in its scope to the details of construction and arrangement of this specific embodiment. The invention is capable of being practiced or carried out in various ways. Also, in describing the preferred embodiment, specific terminology will be resorted to for the sake of clarity. It is to be understood that each specific term; includes all technical equivalents which operate in a similar manner to accomplish a similar purpose.

Referring to the drawings, FIGS. 1-5 illustrate typical large concrete support foundations for tall and heavy structures including towers which may be used to support wind turbines, power transmission lines, street lighting and signals, bridge support, commercial signs, freeway signs, ski lifts and the like.

Figure 1:
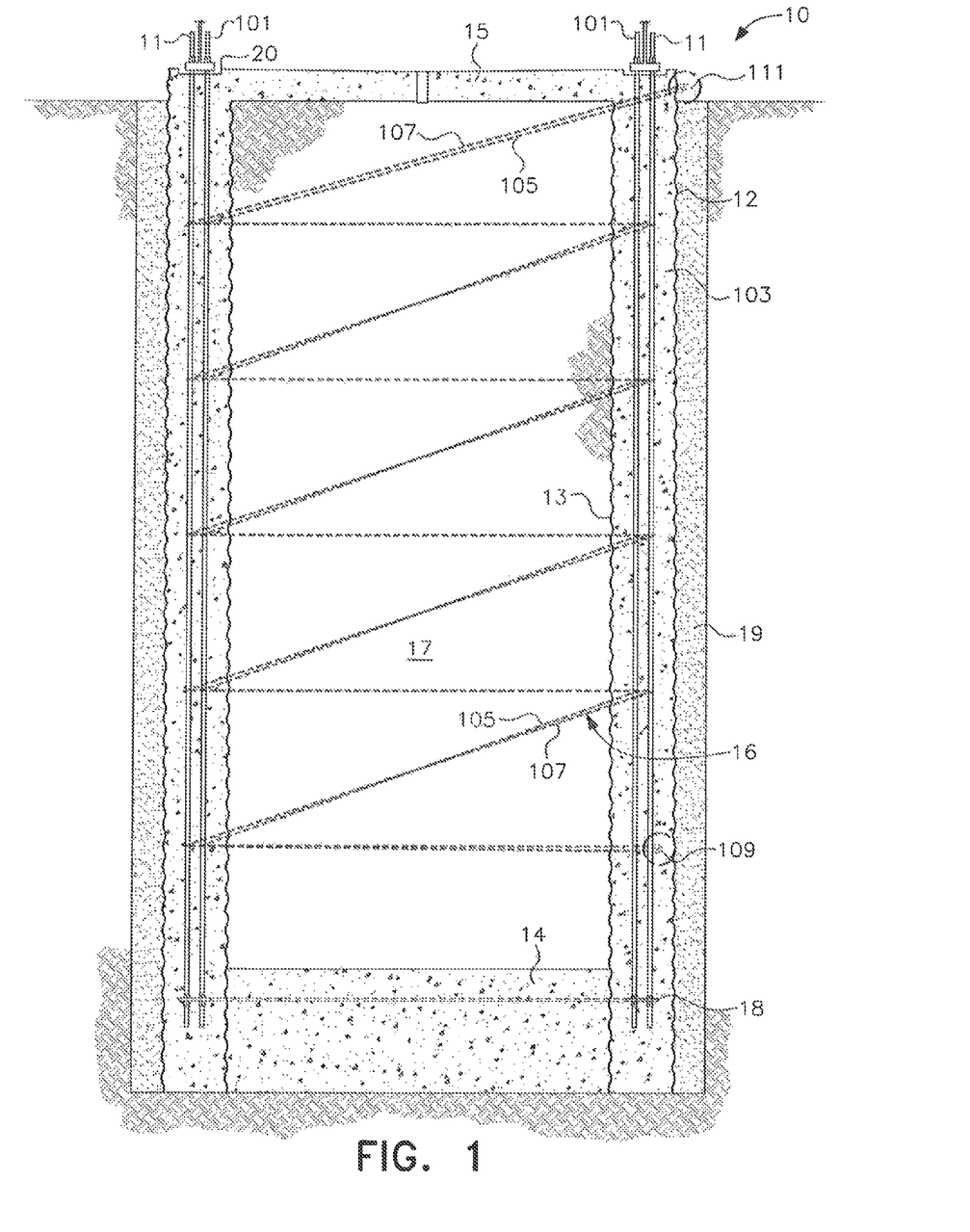
FIG. 1 is a profile view of a tensionless pier foundation as disclosed in my '417 patent, with tower anchor bolts, outer and inner corrugated metal pipes, embedment ring, concrete plug, soil backfill, slurry backfill, and floor, and a continuous strand hoop reinforcement in accordance with the present invention added in place of conventional rebar hoops.

The tensionless pier foundation shown in FIG. 1 is designated by reference numeral 10. Foundation 10 includes circumferentially spaced rings, tower anchor bolts, including outer anchor bolts 11 and inner anchor bolts 101. The anchor bolts 11 and 101 extend from an embedment ring 18 near the bottom of the foundation up through the grout trough 20 and above the foundation 10. The tower anchor bolts 11 and 101 may number 100 or more and are radially paired in a cylindrical configuration which may have an average diameter of 14 ft. The tower anchor bolts 11 and 101 are typically steel rods about one and one-half inch in diameter. The tower anchor bolts 11 and 101 are generally centered horizontally (laterally) within a concrete filled annulus 103 bounded by an inner corrugated metal pipe 13 and an outer corrugated metal pipe 12 extending the length (depth) of the foundation which may be 30 ft. or more. Inside the inner corrugated metal pipe 13, a concrete plug 14 is situated at and above the bottom covered with loose soil backfill 17 extending to the bottom of the foundation floor 15 at the top of the foundation.

Figure 1A:
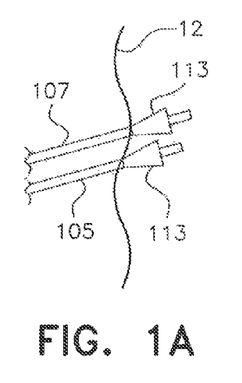
FIG. 1A is a profile detailed view showing the exposed ends of the continuous strand hoop reinforcements shown in FIG. 1.
Figure 1B:
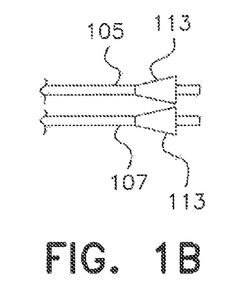
FIG. 1B is a profile detailed view showing the embedded ends of the continuous strand hoop reinforcements shown in FIG. 1.

The continuous strand hoop reinforcement in accordance with the present invention shown in FIG. 1 is generally designated by reference numeral 16 and includes an inner hoop reinforcement 105 and an outer hoop reinforcement 107. Both the inner hoop reinforcement 105 and the outer hoop reinforcement 107 are embedded adjacent the bottom of the concrete foundation at the detail bottom end identified by reference numeral 109 and shown in FIG. 1B. The inner hoop reinforcement 105 is spirally wound upwardly around the ring of inner anchor bolts 101 where the hoop exits the concrete foundation at detail top end identified by reference numeral 111, shown in FIG. 1A. While the continuous strand reinforcing hoops 105 and 107 are shown in FIG. 1 as wound in the same direction and generally adjacent each other, those skilled in the art will readily understand that the hoops can be wound in the same direction in a spaced relationship and even wound in opposite directions as appropriate.

The continuous strand reinforcing hoops 105 and 107 comprise strands preferably made of high strength wires, approximately 250 ksi, twisted into a cable or the like, more or less one-half inch in diameter, which is greased and rubber-sleeved, to prevent the reinforcement hoops 105 and 107 from bonding with the concrete foundation. Alternate structures and methods can be used to cover or coat the stretchable wire or cable in order to prevent the bonding, as will be understood by those skilled in the art. Terminating the continuous strand reinforcing hoops 105 and 107 is a wedged nut-like apparatus 113 placed at each end of the continuous strand hoops. At the embedded end shown at reference numeral 109, the wedged nut-like apparatus bonds to the concrete and prevents the embedded end of the continuous strand hoops 105 and 107 from moving during any post-tensioning operation. Post-tensioning of the continuous strand hoops 105 and 107 is accomplished by pulling the exposed end at reference numeral 111, shown in FIG. 1A, through the wedged nut-like apparatus 113 against a base plate (not shown) positioned against the outside of outer corrugated pipe 12, as is well understood by those skilled in the art.

Figure 2:
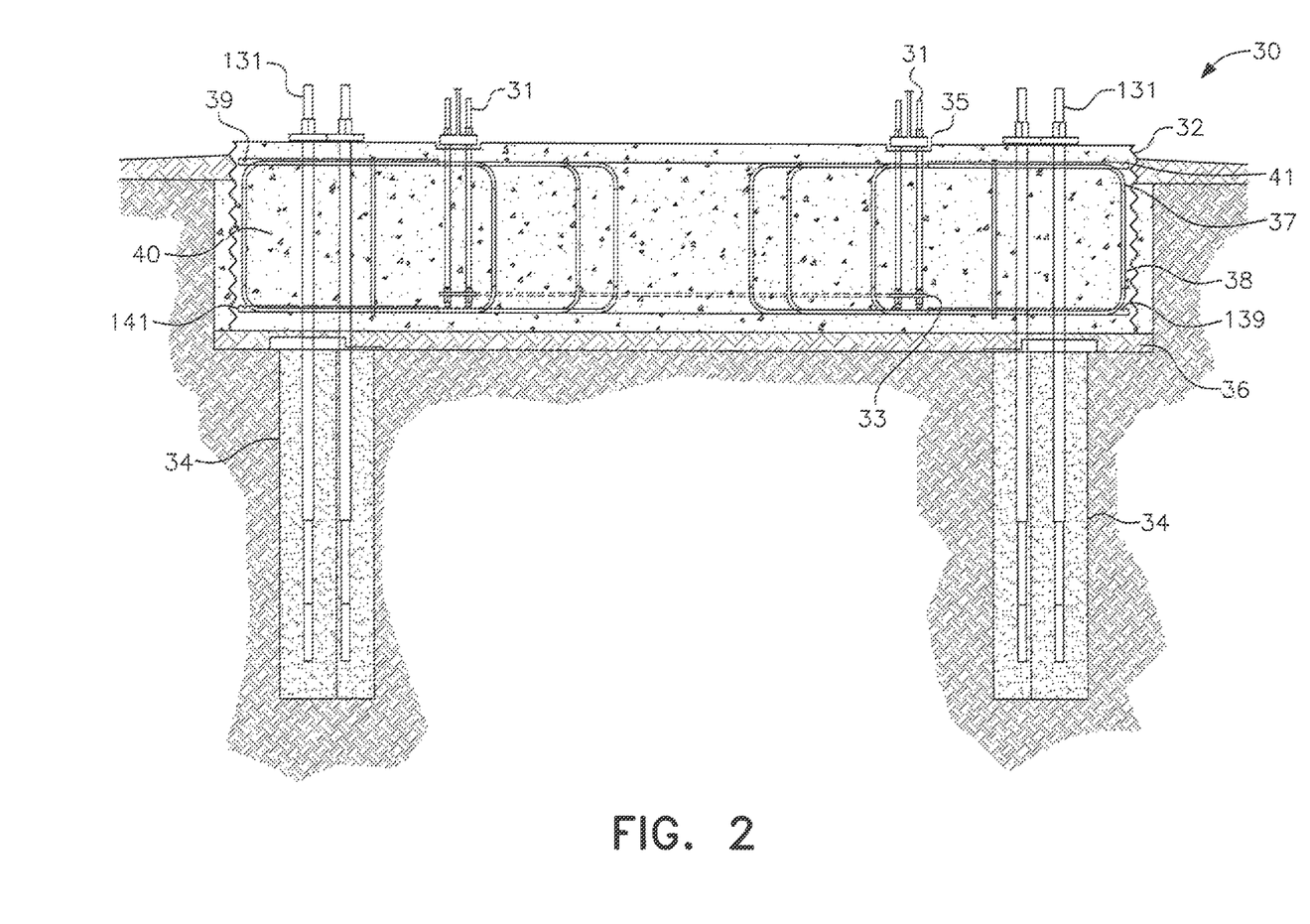
FIG. 2 is a profile view of a post-tensioned pile anchor foundation as disclosed in my '797 patent, with tower anchor bolts, perimeter corrugated metal pipe, embedment ring, horizontal (lateral) reinforcing steel, leveling course, pile anchor, and grout trough, and continuous strand reinforcing hoops in accordance with the present invention added in place of conventional rebar hoops.
Figure 3:
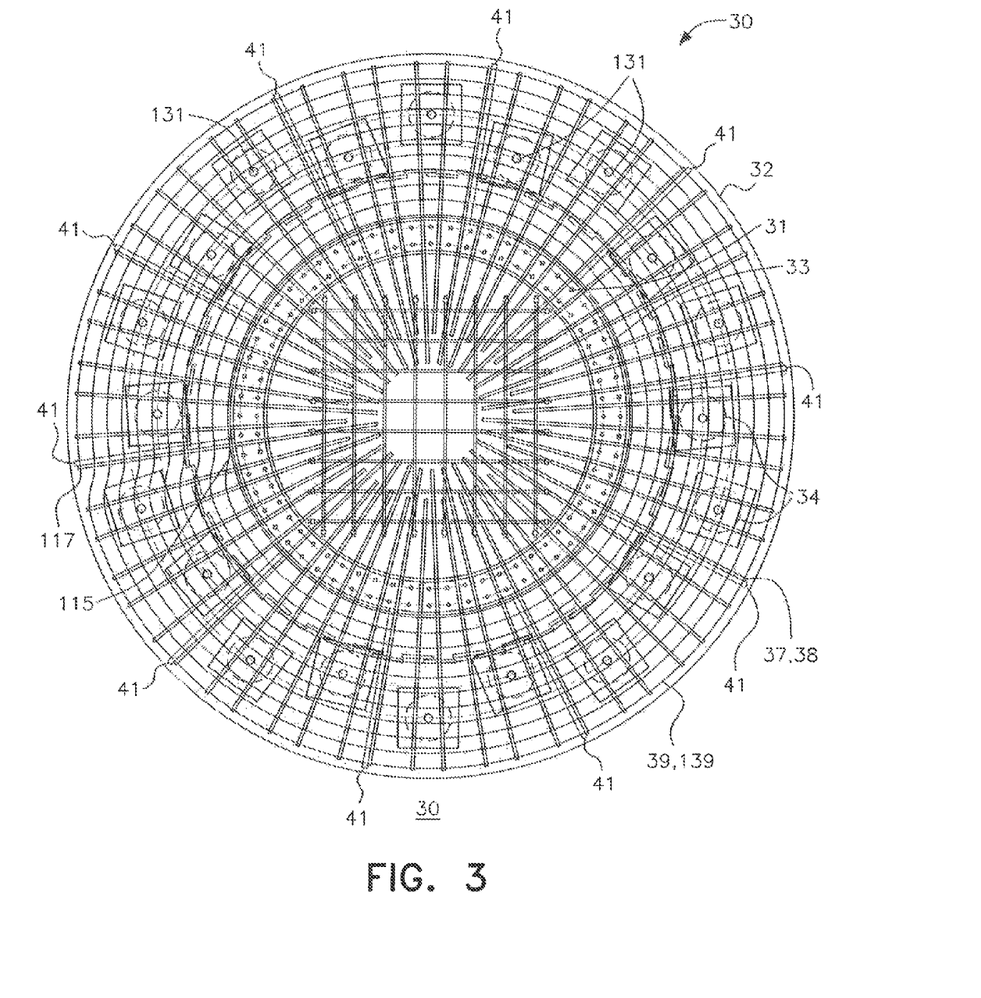
FIG. 3 is a top view of the post-tensioned pile anchor foundation shown in FIG. 2 with tower anchor bolts, perimeter corrugated metal pipe, embedment ring, top and bottom horizontal (lateral) reinforcing steel, leveling course, pile anchors, and grout trough, and the continuous strand reinforcing hoops with coiled strand hoop guides in accordance with the present invention.

The pile anchor foundation shown in FIGS. 2 and 3 is designated by reference numeral 30. Foundation 30 includes tower anchor bolts 31 extending from the embedment ring 33 near the bottom of the concrete foundation cap 40 through the grout trough 35 and above the top of the foundation cap 40. The tower anchor bolts 31 may number 100 or more and are radially paired in cylindrical configuration which may have an average diameter of 24 ft. centered in the concrete foundation and 5 ft. in depth bounded by a perimeter corrugated metal pipe 32 constructed in-situ atop a concrete or gravel leveling course 36. The tower anchor bolts 31 are typically steel rods having a one and one-half inch diameter. The concrete foundation cap 40 may have horizontal (lateral) steel near the top and bottom of the concrete foundation cap 40 with numeral reference designation 37 for the upper horizontal (lateral) steel and numeral reference designation 38 for the lower horizontal (lateral) steel. The horizontal (lateral) steel (both top 37 and bottom 38) is circumferentially placed and connected by the continuous strand reinforcing hoops 39 and 139 which connect to the top horizontal steel 37 and bottom horizontal steel 38, respectively. The continuous strand hoop reinforcements 39 and 139 are preferably positioned by coiled strand hoop guides 41 and 141, top and bottom respectively. While ten coiled strand hoop guides 41 are shown circumferentially spaced around in FIG. 3, the number of such guides can vary depending upon the size of the foundation 30 and should preferably range between about 6 and about 12.

Figure 6:
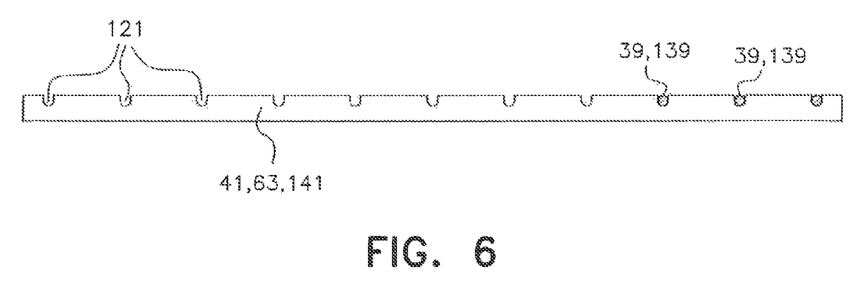
FIG. 6 is an enlarged profile view of a single coiled strand hoop guide with notches for strand placement in accordance with the present invention.

As shown, the continuous strand reinforcing hoops 39 and 139 are spirally wound in a generally horizontal configuration, extending adjacent the center for the embedded end 115 and adjacent the foundation exterior for the post-tensioning end 117 (see FIG. 3). The windings are preferably spaced apart approximately six inches, thus the notches 121 of the guide 41/63, shown in FIG. 6, are similarly spaced. The structure and operation of the continuous strand reinforcing hoops 39 and 139 are the same as previously described for strand hoops 105 and 107 in the FIG. 1 embodiment.

Figure 4:
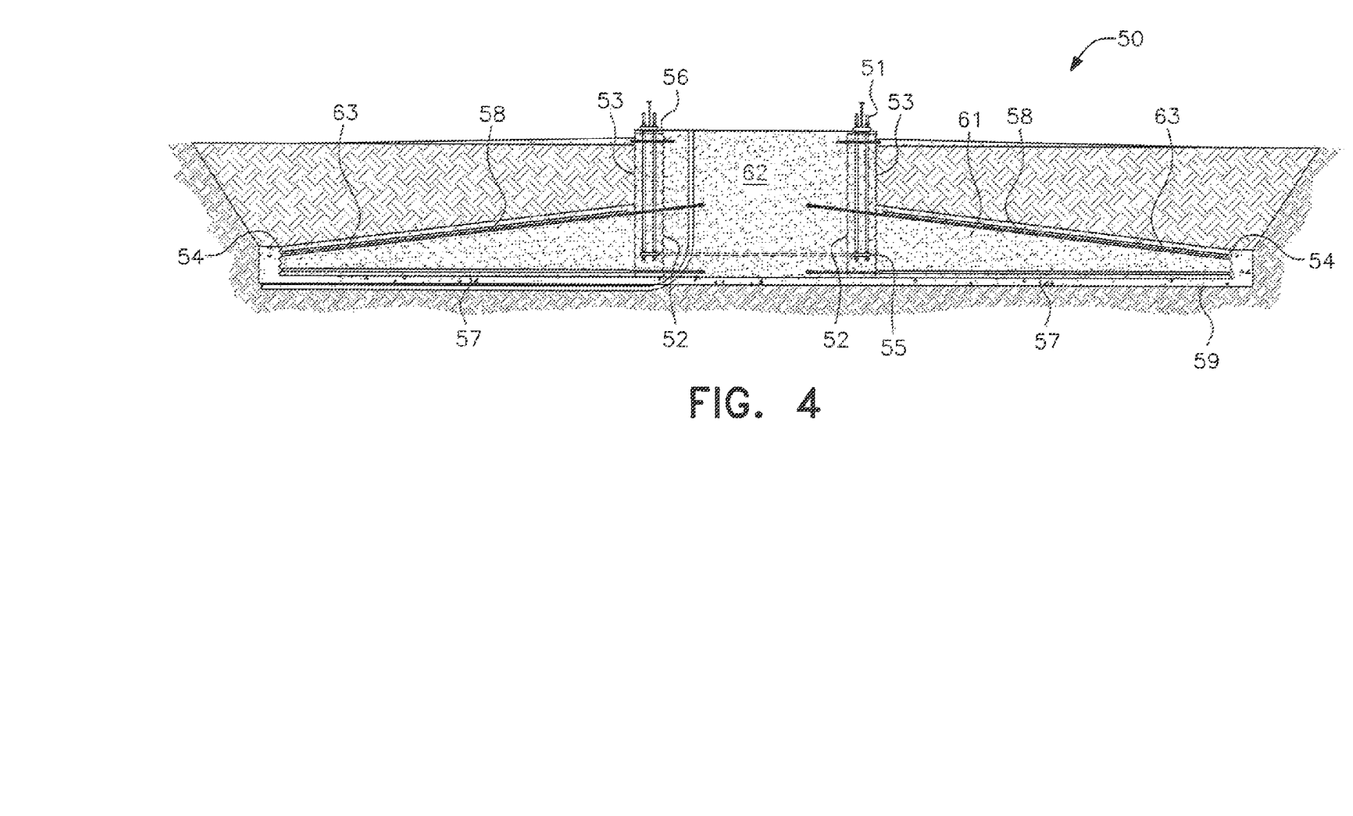
FIG. 4 is a profile view of the P&H spread foundation, with tower anchor bolts, pedestal inner corrugated metal pipe, pedestal outer corrugated metal pipe, base perimeter corrugated metal pipe, embedment ring, grout trough, top horizontal (lateral) steel bolts, bottom horizontal (lateral) steel bolts, and leveling course, and continuous strand reinforcing hoops with the coiled strand hoop guides in accordance with the present invention.
Figure 5:
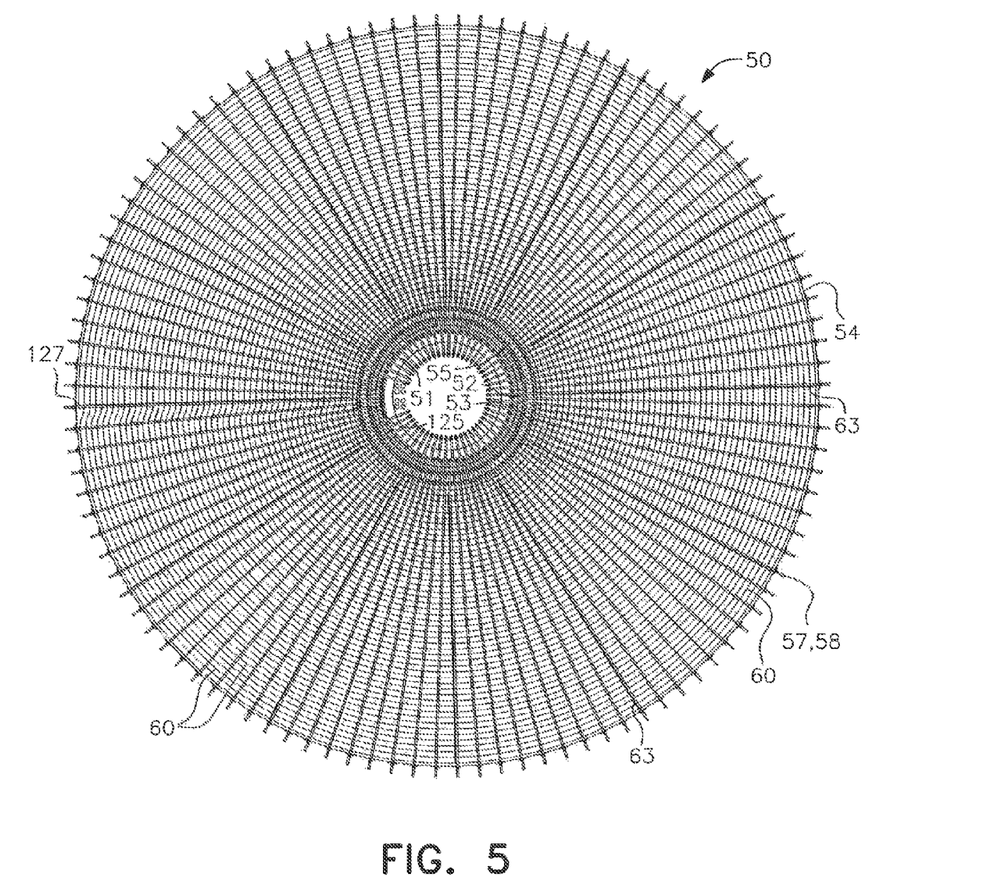
FIG. 5 is a top profile view of the P&H spread foundation shown in FIG. 4, with post-tensioned anchor bolts, pedestal inner corrugated metal pipe, pedestal outer corrugated metal pipe, base perimeter metal pipe, grout trough, and top horizontal (lateral) steel bolts, with the coiled strand hoop guides, and continuous strand reinforcing hoops.

The P&H spread foundation shown in FIGS. 4 and 5 is designated by reference numeral 50. Foundation 50 includes tower anchor bolts 51 extending from the embedment ring 55 near the bottom of the foundation through the grout trough 56 and above foundation 50. The tower anchor bolts 51 may number 100 or more, with a 1½" diameter, and are radially paired in a cylindrical configuration which may have an average diameter of 14 ft. The tower anchor bolts 51 are centered within a concrete filled annulus foundation pedestal 62 bounded by the pedestal outer corrugated metal pipe 53 extending the length (depth) of the foundation pedestal 62 which may be 10 ft. and is filled with concrete. The foundation pedestal 62 may also include an inner corrugated metal pipe 52.

The foundation pedestal 62 may be embedded 5 ft. into the foundation base spread element 61 which may be 60 ft. in diameter and bounded by the base perimeter corrugated metal pipe 54. The P&H spread foundation 50 may have horizontal (lateral) steel near the top and bottom of the spread foundation 50 with numeral reference designation 57 for the bottom horizontal (lateral) steel and 58 for the top horizontal (lateral) steel. The horizontal (lateral) steel (both top 58 and bottom 57) is circumferentially placed and connected by the continuous strand reinforcing hoops 60 positioned by the coiled strand hoop guides 63.

The continuous strand reinforcing hoops 60 have the same structure and operation as previously described in connection with the continuous strand hoop reinforcements 105 and 107 of FIG. 1 and the continuous strand reinforcing hoops 39 and 139 of FIGS. 2 and 3. The continuous strand reinforcing hoops 60 extend from the embedded end 125 to the exposed end 127. The coiled strand hoop guide 63 is also illustrated in FIG. 6 and has the same structure and operation as previously described for coiled strand hoop guide 41 of the embodiment shown in FIGS. 2 and 3.

Construction Sequence and Special Features

The tensionless pier foundation 10 may be constructed in-situ by excavating a nearly circular hole by drill rig or track excavator to the intended tensionless pier foundation depth. The outer corrugated metal pipe 12 is centered in the excavation plumb and the annular space between the edge of excavation and the perimeter of the outer corrugated metal pipe 12 is backfilled with slurry 19. The inside tower anchor bolts 101 are loaded into the bolt holes in a template (not shown) suspended above the outer corrugated metal pipe 12. The template and inner bolts 101 are lifted from inside the outer corrugated metal pipe 12 and suspended along side the excavation for placement of the embedment ring 18 on the inner tower anchor bolts 101. Following loading of inner tower anchor bolts 101 in the embedment ring 18, the inner tower anchor bolts 101 are lowered inside the outer corrugated metal pipe 12 while the continuous strand hoop reinforcement 105 is wound and wire tied around the inner tower anchor bolts 101 in a generally spherical or helical configuration. Once the continuous strand hoop reinforcement 105 is wound around the inner tower anchor bolts 101 the template and inner tower anchor bolts 11 are again lifted from inside the outer corrugated metal pipe 12 and the same procedure followed for placement of the continuous strand hoop 107 around outer tower anchor bolts 11. After lowering and plumbing the tower anchor bolts 11 and 101, the inner corrugated metal pipe 13 is placed and plumbed, the concrete plug 14 poured and set, the soil backfill 17 placed, and the tensionless pier foundation 10 concrete monolithically poured. Once the concrete has sufficiently cured and set, the anchor bolts 11 and 101 and the continuous strand hoop reinforcements 105 and 107 can be appropriately post-tensioned.

The pile anchor foundation 30 may be constructed in-situ by excavating for the concrete foundation cap 40, installing the pile anchors 131, pouring the leveling course 36, installing the tower anchor bolts 31 with the embedment ring 33 near the bottom of the foundation cap 40 and the template ring (not shown) at the top centered in the foundation cap 40. The bottom horizontal (lateral) reinforcing steel 38 and the coiled strand hoop guides 141 are installed at approximately equal intervals between selected bottom horizontal steel 38 and wire tying continuous strand reinforcing hoops 139 in the coiled strand hoop guides 141. The top horizontal (lateral) reinforcing steel 37 is placed and coiled strand hoop reinforcing guides 41 installed between selected top horizontal (lateral) reinforcing steel 37. Continuous strand hoop reinforcing 39 is then placed and tied into the coiled strand hoop guides 41. Finally, the perimeter corrugated metal pipe 32 is placed and the concrete foundation cap is monolithically poured. Once the concrete has sufficiently cured and set, the pile anchors 131 and continuous strand reinforcing hoops 39 and 139 can be appropriately post-tensioned in order to complete the pile anchor foundation.

The P&H spread foundation 50 may be constructed in-situ by excavating for the foundation base spread element 61, pouring the leveling course 59, installing the tower anchor bolts 51 centered in the foundation 50 footprint with the embedment ring 55 near the bottom of the foundation 50 and template ring (not shown) at the top centered in the annular space between the pedestal outer corrugated metal pipe 53 and the pedestal inner corrugated metal pipe 52. After forming the pedestal foundation 62, the elements of foundation base spread 61 are installed beginning with the base perimeter corrugated metal pipe 54, then inserting the bottom horizontal (lateral) steel bolts through holes in radial alignment in each of the three corrugated metal pipes, then placing 6 coiled strand hoop guides 63 at approximately 60° intervals between selected bottom horizontal (lateral) steel bolts 57, then placing and wire tying continuous strand hoop reinforcement 60 into the coiled strand hoop guide 63, then install the top horizontal (lateral) steel bolts, 6 coiled strand hoop guides 63, and the continuous strand hoop reinforcing steel 60 same as required for at the bottom of the spread foundation 50. Following installation of steel elements of the spread foundation 50 the concrete is poured monolithically. After adequate concrete strength is obtained, the horizontal (lateral) steel bolts top 58 and bottom 57 are post-tensioned followed by post-tensioning of the continuous strand hoop reinforcement 60.

The foregoing descriptions for the construction sequence of the tensionless pier foundation 10, the pile anchor foundation 30 and the P&H spread foundation 90 are intended to be exemplary and should not be considered as limiting, since other sequences and possible alternative procedures are readily available and understood by those skilled in the art.

What is claimed is:

1. A concrete foundation with continuous strand hoop reinforcement for supporting dynamic tall, heavy, and/or large structures including towers and/or poles which can be precast or constructed in-situ comprising:
    a spread foundation including a concrete central pedestal and a concrete base spread element;
    a plurality of tower anchor bolts in spaced relationship arranged as a ring around a center of said foundation, said tower anchor bolts being embedded in said pedestal;
    a first plurality of laterally directed reinforcing elements embedded in said concrete base spread element and extending outwardly from the pedestal to an outer perimeter of said spread element near a bottom of said spread element;
    a first continuous strand reinforcing hoop extending outwardly in a generally spiral configuration from an embedded end near the pedestal to an outer end adjacent the outer perimeter of said spread element near the bottom of said spread element, said first continuous strand reinforcing hoop being adjacent the first plurality of laterally directed reinforcing elements;
    a second plurality of laterally directed reinforcing elements embedded in said concrete base spread element and extending outwardly from the pedestal to the outer perimeter of said spread element, said second plurality of laterally directed reinforcing elements being spaced above said first plurality of laterally directed reinforcing elements;
    a second continuous strand reinforcing hoop extending outwardly in a generally spiral configuration from an embedded end near the pedestal to an outer end adjacent the outer perimeter of said spread element near the top of said spread element, said second continuous strand reinforcing hoop being adjacent the second plurality of laterally directed reinforcing elements; and
    said first and second continuous strand reinforcing hoops near the bottom and the top of the spread element, respectively, reinforcing the concrete to prevent cracking and significantly reducing foundation deflection and distortion.

2. The foundation as set forth in claim 1, wherein each of the first and second continuous strand reinforcing hoops is made of a plurality of high strength wires twisted together into a cable, said wires having a strength on the order of 250 ksi.

3. The foundation as set forth in claim 2, further comprising:
    a first plurality of strand hoop guides installed at intervals between selected ones of said first plurality of laterally directed reinforcing elements, a position of said first continuous strand reinforcing hoop being guided by said first plurality of strand hoop guides; and
    a second plurality of strand hoop guides installed at intervals between selected ones of said second plurality of laterally directed reinforcing elements, a position of said second continuous strand reinforcing hoop being guided by said second plurality of strand hoop guides.

4. The foundation as set forth in claim 3, wherein the cable forming the continuous strand reinforcing hoops is a continuous steel strand inside a rubber coating or flexible sleeve to prevent concrete bonding to the strand or cable to allow the strand or cable to be pulled, elongated and post-tensioned.

5. The foundation as set forth in claim 2, wherein each of the first and second continuous strand reinforcing hoops forms a plurality of windings as said respective hoop extends from near the pedestal outwardly toward the outer perimeter of the spread element on a generally horizontal plane, said windings being spaced from one another by about six inches.

6. The foundation as set forth in claim 1, wherein the first and second continuous strand reinforcing hoops are wire-tied to the first and second plurality of laterally directed reinforcing elements, respectively.

7. The foundation as set forth in claim 1, wherein said pedestal is embedded within a central part of said base spread element, said base spread element having a diameter of about 60'.

8. The foundation as set forth in claim 1, wherein the tower anchor bolts are radially paired in a cylindrical configuration having an average diameter of about 24'.

9. The foundation as set forth in claim 1, wherein the continuous strand reinforcing hoops are post-tensioned.

10. The foundation as set forth in claim 1, wherein the continuous strand reinforcing hoops replace conventional rebar hoops and are made of high strength steel which requires up to less than half the steel weight, volume, and length as conventional rebar hoops.

11. A concrete foundation having a continuous strand hoop reinforcement comprising:
   a first set of laterally directed reinforcing elements embedded in said concrete foundation near a bottom of said foundation;
   a first continuous strand reinforcing hoop extending outwardly in a spiral configuration from an embedded end near the center of the foundation outwardly to adjacent an outer perimeter of said foundation, said second continuous strand reinforcing hoop being adjacent the first set of laterally directed reinforcing elements near the bottom of said foundation;
   a second set of laterally directed reinforcing elements embedded in said concrete foundation near a top of said foundation;
   a second continuous strand reinforcing hoop extending outwardly in a spiral configuration from an embedded end near the center of the foundation outwardly to adjacent the outer perimeter of said foundation, said second continuous strand reinforcing hoop being adjacent the second set of laterally directed reinforcing elements near the top of said foundation; and
   the first and second continuous strand reinforcing hoops reinforcing the concrete to prevent cracking and significantly reducing foundation deflection and distortion.

12. The foundation with continuous strand hoop reinforcement as set forth in claim 11, wherein the first and second continuous strand reinforcing hoops each form a plurality of windings as said respective hoop extends from near the foundation center outwardly toward the foundation outer perimeter on a generally horizontal plane, said windings being spaced from one another by about six inches.

13. The foundation with continuous strand hoop reinforcement as set forth in claim 11, wherein the cables forming the continuous strand reinforcing hoops are made of a plurality of high strength wires twisted together into a cable, said wires having a strength on the order of 250 ksi.

14. The foundation with continuous strand hoop reinforcement as set forth in claim 11, wherein the first and second continuous strand reinforcing hoops are wired tied to the first and second sets of laterally directed reinforcing elements, respectively.

15. A method of constructing a concrete spread foundation having a pedestal and a base spread element in-situ comprising the steps of:
   placing a plurality of lower laterally extending steel bolts near a bottom of the spread element of the foundation, said plurality of lower laterally extending steel bolts extending from the pedestal to adjacent an outer perimeter of said spread element;
   securing a first continuous strand hoop reinforcement cable relative to the lower laterally extending steel bolts at spaced intervals, said first continuous strand hoop reinforcement cable extending outwardly in a generally spiral configuration and in a generally horizontal plane from an embedded end near the center of the foundation outwardly to an outer end adjacent the outer perimeter of said spread element near the bottom of said spread element;
   placing a plurality of upper laterally extending steel bolts near the top of the spread element, said plurality of upper laterally extending steel bolts extending from the pedestal to adjacent the outer perimeter of said spread element;
   securing a second continuous strand hoop reinforcement cable relative to the upper laterally extending steel bolts at spaced intervals, said second continuous strand hoop reinforcement cable extending outwardly in a generally spiral configuration and in a generally horizontal plane from an embedded end near the center of the foundation outwardly to an outer end adjacent the outer perimeter of said spread element near the top of the foundation; and
   pouring concrete monolithically to form the pedestal and the base spread element with said steel bolts and said first and second continuous strand hoop reinforcement cables substantially embedded in said concrete.

16. The method as set forth in claim 15, wherein the step of securing the first continuous strand hoop reinforcement cable includes installing first plurality of coiled strand hoop guides at intervals between selected ones of said plurality of lower laterally extending steel bolts and placing the first continuous strand hoop reinforcement cable into grooves formed in said first plurality of hoop guides, and the step of securing the second continuous strand hoop reinforcement cable includes installing a second plurality of coiled strand hoop guides at intervals between selected ones of said plurality of upper laterally extending steel bolts and placing the second continuous strand hoop reinforcement cable into grooves formed in said second plurality of hoop guides.

17. The method as set forth in claim 15, wherein the steps of securing the first and second continuous strand hoop reinforcement cables at spaced intervals includes wire tying the first continuous strand hoop reinforcement cable to selected ones of said plurality of lower laterally extending steel bolts and wire tying the second continuous strand hoop reinforcement cable selected ones of said plurality of upper laterally extending steel bolts at said spaced intervals.

18. The method as set forth in claim 17, wherein each continuous strand hoop reinforcement cable is made of a plurality of high strength wires twisted together to form said cable, said wires having a strength on the order of 250 ksi, said steps of securing the continuous strand hoop reinforcement cables including forming a plurality of windings as said respective hoop reinforcement cable is placed spirally to extend from near the pedestal outwardly toward the outer perimeter of the spread element on a plane substantially parallel with and adjacent a respective one of said plurality of lower steel bolts and said plurality of upper steel bolts, said windings being spaced from one another by about six inches.

19. The method as set forth in claim 17, further comprising the step of installing a plurality of coiled strand hoop guides at intervals between selected ones of at least said plurality of lower laterally extending steel bolts and said plurality of upper laterally extending steel bolts, respectively.

20. The method as set forth in claim 15, further comprising, after adequate concrete strength is obtained, following concrete pour, the step of post-tensioning the continuous strand hoop reinforcement cables at said cable outer ends.

21. A concrete foundation with continuous strand hoop reinforcement for supporting dynamic tall, heavy, and/or large structures including towers and/or poles which can be precast or constructed in-situ comprising:

a spread foundation including a concrete central pedestal and a concrete base spread element;

a first plurality of laterally directed reinforcing elements embedded in said concrete base spread element and extending outwardly from the pedestal to an outer perimeter of said spread element near a bottom of said spread element;

a first continuous strand reinforcing hoop extending outwardly in a generally spiral configuration and in a generally horizontal plane from an embedded end near the pedestal to an outer end adjacent the outer perimeter of said spread element near the bottom of said spread element;

a second plurality of laterally directed reinforcing elements embedded in said concrete base spread element and extending outwardly from the pedestal to the outer perimeter of said spread element, said second plurality of laterally directed reinforcing elements being spaced above said first plurality of laterally directed reinforcing elements;

a second continuous strand reinforcing hoop extending outwardly in a generally spiral configuration and in a generally horizontal plane from an embedded end near the pedestal to an outer end adjacent the outer perimeter of said spread element near the top of said spread element; and said continuous strand hoops reinforcing the concrete to prevent cracking and significantly reducing foundation deflection and distortion.

22. The foundation as set forth in claim 21, wherein each of the first and second continuous strand reinforcing hoops is made of a plurality of high strength wires twisted together into a cable, said wires having a strength on the order of 250 ksi.

23. The foundation as set forth in claim 21, further comprising a plurality of coiled strand hoop guides installed at intervals between selected ones of at least one of said first plurality of laterally directed reinforcing elements and said second plurality of laterally directed reinforcing elements, respectively, said hoop guides guiding placement of said continuous strand hoops in said generally spiral configuration.

24. The foundation as set forth in claim 21, wherein each of the first and second continuous strand reinforcing hoops forms a plurality of windings on a plane substantially parallel with and adjacent a respective one of said first plurality of laterally directed reinforcing elements and said second plurality of laterally directed reinforcing elements as said respective hoop extends from near the pedestal outwardly toward the outer perimeter of the spread element.

25. The foundation as set forth in claim 24, wherein said windings are spaced from one another by about six inches.

26. The foundation as set forth in claim 21, wherein said first continuous strand reinforcing hoop is wire-tied to said first plurality of laterally directed reinforcing elements at spaced intervals and said second continuous strand reinforcing hoop is wire-tied to said second plurality of laterally directed reinforcing elements at spaced intervals.

\* \* \* \* \*